United States Patent [19]
Moser et al.

[11] Patent Number: 4,959,247
[45] Date of Patent: Sep. 25, 1990

[54] ELECTROCHROMIC COATING AND METHOD FOR MAKING SAME

[75] Inventors: Frank H. Moser; Niall R. Lynam, both of Holland, Mich.

[73] Assignee: Donnelly Corporation, Holland, Mich.

[21] Appl. No.: 132,196

[22] Filed: Dec. 14, 1987

[51] Int. Cl.$^5$ .................... B05D 5/12; B05D 5/06
[52] U.S. Cl. ........................ 427/126.5; 427/108; 427/110; 427/126.6; 427/165; 427/168; 427/169; 427/226
[58] Field of Search ............... 427/126.6, 126.5, 226, 427/230, 108, 165, 169, 110, 168

[56] References Cited

U.S. PATENT DOCUMENTS

| | | | |
|---|---|---|---|
| 2,694,761 | 11/1954 | Tarnopol | 427/110 |
| 3,019,136 | 1/1962 | Auffenorde et al. | 427/110 |
| 3,850,665 | 11/1974 | Plumat et al. | 427/226 |
| 3,984,591 | 10/1976 | Plumat et al. | 427/110 |
| 4,000,346 | 12/1976 | Dowell | 427/110 |
| 4,042,483 | 8/1977 | Bouy et al. | 427/126.6 |
| 4,142,005 | 2/1979 | Caldwell et al. | 427/126.6 |
| 4,242,374 | 12/1980 | Sunsregret | 427/110 |
| 4,266,335 | 5/1981 | Matsumoto | 29/592 R |
| 4,342,792 | 8/1982 | Brown et al. | 427/226 |
| 4,391,668 | 7/1983 | Armstrong | 427/226 |

FOREIGN PATENT DOCUMENTS 55-011208  1/1980  Japan .

OTHER PUBLICATIONS

"Transition Metal Oxide Gels", *Glass... Current Issues*, ©1985, Martinus Nijhoff Publishers.
R. B. Pettit and C. J. Brinker, "Use of Sol Gel Thin Films In Solar Energy Applications," Sandia National Laboratories, Albuquerque, New Mexico 87185.
Helmut Dislich, "New Routes to Multicomponent Oxide Glasses," Angewandte Chemie International Edition, vol. 10, No. 6, Jun. 1971 (pp. 363–434).
H. Schroeder, "Properties and Applications of Oxide Layers Deposited on Glass from Organic Solutions".
Sakka et al., "Formation of Sheets and Coating Films from Alkoxide Solutions," Institute for Chemical Research, Kyoto University, Uji, Kyoto-Fu 611.
Sumio Sakka, "Gel Method for Making Glass," *Treatise on Materials, Science and Technology*, vol. 22, ©1982, by Academic Press, Inc.
Eckhart K. Hussmann, "Dip Coatings: Characteristics, Properties, Applications," Symposium on Optical Service Technology, SPIE, vol. 381 (1983).
Lisa C. Klein, "Oxide Coatings from the Sol Gel Process," Proceedings of the Twelfth Automotive Materials Conference (1984).
Laurel M. Sheppard, "Better Ceramics Through Chemistry," ME, Jun. 1984.
Publication Entitled "Spray Deposition and Properties of Electrochromic Tungsten Oxide", dated Jul. 1986.
Bradley, Mehrotra and Gaur, "Metal Alkoxides," pp. 7–9 and 14–39 (1978).
Yamanaka, Oakomoto, Kidou and Kudo, "Peroxotungstic Acid Coated Films for Electrochromic Display Devices," Jun. 21, 1986.

*Primary Examiner*—Janyce Bell
*Attorney, Agent, or Firm*—Price, Heneveld, Cooper, DeWitt & Litton

[57] ABSTRACT

Transition metal nitrates such as nickel nitrate are dissolved in monoalcohols having from 1 to 5 carbon atoms. The coatings are applied to a substrate material and fired to convert the coating to an electrochromically active state.

42 Claims, 5 Drawing Sheets

ELECTROCHROMIC COATING AND METHOD FOR MAKING SAME

BACKGROUND OF THE INVENTION

The present invention relates to a method for producing electrochromic films on glass or equivalent substrates, such as ceramics.

Electrochromic films undergo reversible coloration induced by an applied electric field or current. These solid-state inorganic electrochromic layers can be broadly classified into those that color cathodically due to dual injection of electrons and ions (typically group VI-b oxides, such as $WO_3$ and $MoO_3$) and those that color anodically due to dual ejection of electron and cation or electron ejection/anion injection (typically group VIII oxides, such as $IrO_2$, $Rh_2O_3$, NiO and CoO). Such coatings are used in information display devices, solar control windows, and light modulators.

Vacuum techniques, typically evaporation and sputtering, are widely used to deposit electrochromic thin films. Nonvacuum techniques, such as anodization and atmospheric chemical vapor deposition are also reported. Evaporation deposition and sputter coating require a high vacuum. The necessary equipment is expensive, making such processes capital intensive. However, they have been commonly used to produce electrochromic coatings.

Three similar nonvacuum coating techniques which have not been used to any significant degree for electrochromic coatings are dip coating, spray coating and spin coating. Dip coating is commonly used to coat glass with $SiO_2$. It involves lowering a glass substrate into a solution containing an appropriate precursor of the desired oxide.[1] This is typically a solution of a partially hydrolyzed alkoxide dispersed in a suitable organic solvent, e.g., tetraethylorthosilicate dissolved in an ethanolic solution and partially hydrolyzed. After dipping the substrate into the solution, the glass is withdrawn at a controlled rate. As the glass is withdrawn (typically at a rate of several centimeters per minute), the solution coats the surface. The coating is then dried and fired in an oven to complete hydrolysis and condensation and to densify the newly formed oxide coating.

[1] Spin coating and spray coating are similar except that instead of dipping the glass, the precursor solution is applied to the glass, which is spun to spread the coating out, or is sprayed onto heated glass.

However, the alkoxylates of some of the important electrochromic metal oxides do not afford satisfactory coating results if directly dissolved in typical solvents. For example, unsatisfactory results have been obtained attempting to dip coat a glass substrate in a solution formed by dissolving tungsten butyrate in alcohol solution. Hence, an important low cost approach to creating electrochromic coatings appears to be impractical based on present technology.

French Pat. No. 2,527,219 discloses dipping glass substrates in a colloidal polymetallic acid of a transition metal, preferably in aqueous medium. However, such suspensions are reported to be very unstable, having a useful life of 24 hours or less.

Nakatani et al U.S. Pat. No. 4,420,500 discloses the deposition of transparent conducting films onto glass and ceramic substrates from a coating composition containing indium compounds and alkyl tin nitrate compounds.

Washo U.S. Pat. No. 4,347,265 discloses forming an electrochromic coating gel by dissolving tungsten chloride or molybdenum chloride in an alcohol or other organic solvent, such as xylene. A glass or indium-tin oxide (ITO) coated glass substrate is coated with this coating and then fired to yield a tungsten oxide coating. However, that process is inoperable with a very important electrochromic material, nickel. Mere dissolution of nickel chloride in alcohol does not result in effective electrochromic coating solutions or resultant effective fired coatings.

SUMMARY OF THE INVENTION

In the present invention, electrochromic coating solutions are prepared by dissolving a transition metal nitrate with lower carbon alcohols. A glass or equivalent substrate, typically having a conductive coating thereon, is coated with the resulting solution, preferably by dipping, to give a coating of the desired thickness. The coating is then dried and fired in an oven to yield an oxide coating having exceptional electrochromic properties.

These and other objects, aspects and advantages of the invention will be more fully understood and appreciated by reference to the written specification.

DESCRIPTION OF THE PREFERRED EMBODIMENT

Successful electrochromic coating requires that:

1. The coating solution must have an adequate shelf life, preferably two weeks or longer. It must not gel or particulate, and it should be stable within the expected usage lifetime, preferably two weeks or longer.
2. The solution must coat the substrate easily. It must wet the surface and fire to a clear oxide with good cosmetics.
3. Once fired, the coating must be functional. It must have the desired hardness, adhesion, optical properties, electrical properties, etc.

These objectives are met in the present invention where, in the preferred embodiment, the hydrated transition metal nitrate is refluxed with a lower carbon alcohol or a mixture of two or more lower carbon alcohols. The reaction vessel is fitted with a stirrer, a thermometer and a reflux condenser to minimize alcohol loss.

Basically, the chemistry involves the formation of a solution of the transition metal nitrate. When a conducting substrate is dipped into this solution, a thin layer of transition metal nitrate is formed and heating the coated substrate to 100° to 400° C. gives an electrochromic coating that has a remarkable change in optical transmission at 550 nm. The coating formed on heating the coated substrate is an oxide coating of the transition metal nitrate used.

For electrochromic coatings, the transition metal must be electrochromically active. Representative examples include nickel, cobalt, manganese, chromium, yttrium, copper and iron. Surprisingly, particularly exceptional results are obtained using solutions of nickel nitrate. Nickel nitrate is the most preferred transition metal nitrate used in the present invention.

The alcohols which are employed in forming solutions comprising transition metal nitrates in accordance with the invention are monoalcohols having from one to five carbon atoms, with alcohols having from one to three carbon atoms being currently preferred. Thus, the most preferred alcohols are methanol, ethanol, propanol, isopropanol and mixtures thereof. The butyl and pentyl alcohols are broadly operable, but the higher alcohols having six or more carbon atoms, and sometimes even the butyl and pentyl alcohols, will sometimes result in transition metal precipitates. At times, solubility can be enhanced and other advantages achieved by using mixtures of alcohols. For example, the use of a methanol and ethanol mixture can be more effective in solubilizing the transition metal nitrates.

Preferably, the transition metal nitrate is slowly added to the alcohol. However, variations of this procedure are operable as is illustrated by the example set forth below. Reflux for a period of time can be used to enhance solubility but appears to be an unnecessary step.

The ratio of transition metal nitrate to alcohol will be varied by the formulator as a function of the thickness of the coating desired, the intended substrate withdrawal rate and the solubility of the nitrate in the solution. If the solution concentration and withdrawal rate result in too heavy a coating, the coating may crack during drying. Typical solutions will comprise from 5 to 20 weight/volume percent transition metal nitrate to alcohol for withdrawal rates of 8 to 50 centimeters per minute. The withdrawal rate will be a function of the thickness desired. With a 5 weight/volume percent metal nitrate to alcohol, the withdrawal rate of 8 to 50 centimeters per minute will yield coatings having a thickness in the range from 500 to 2000 angstroms.

Figure 1:
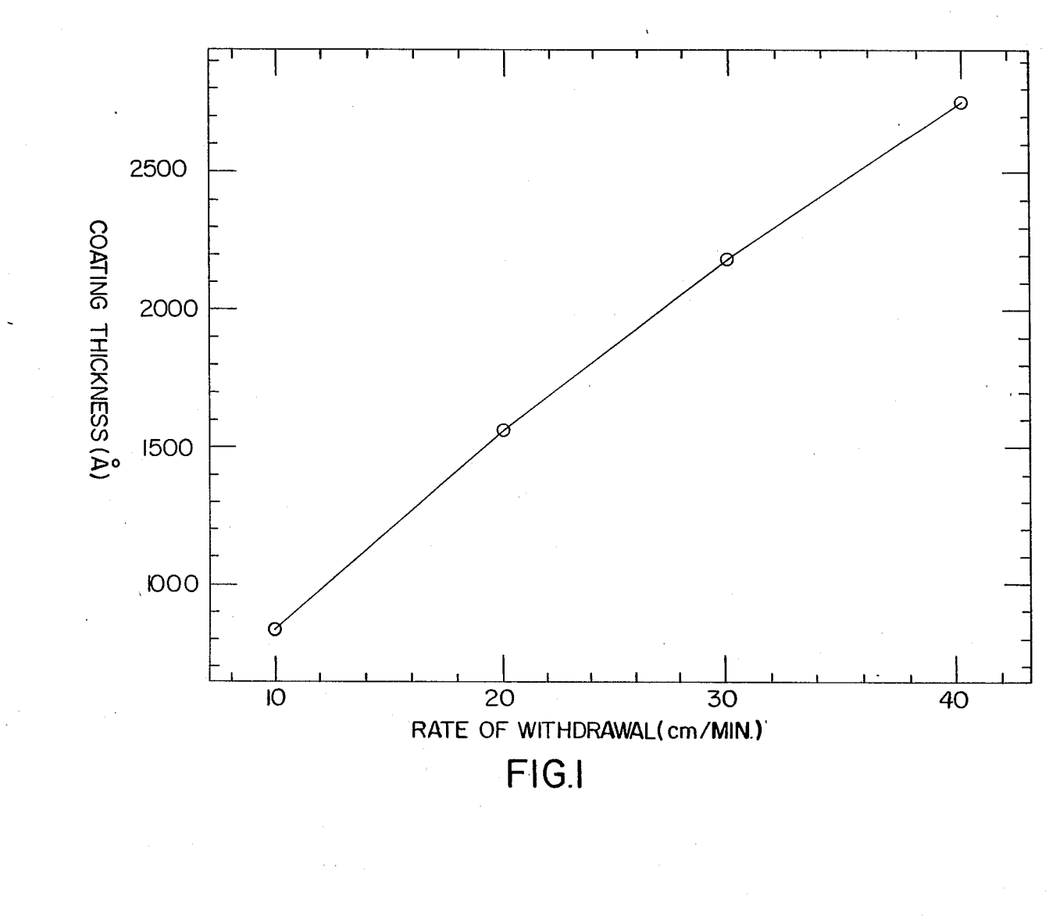
FIG. 1 plots the after-fired thickness of nickel oxide film against the substrate withdrawal rate, using a constant concentration nitrate solution and constant firing conditions.

Coating thickness can generally be determined by the following formula:

$$t = \left(\frac{2 v_s n}{d g}\right)^{\frac{1}{2}}$$

where:
t = coating thickness
$v_s$ = withdrawal rate
n = viscosity
d = coating density
g = gravitational constant The relationship between final coating thickness and withdrawal rate for a specific dipped and fired nickel oxide film, at a specific constant concentration and under specific constant firing conditions (275° C. for one hour), is illustrated in FIG. 1. The procedure outlined in Example 1 was followed, with only the withdrawal rate varied as indicated on the abscissa of the graph of FIG. 1. The coating thickness can be varied as indicated over a wide range merely by regulating withdrawal rate. Since thicker coatings are typically desired, it is particularly advantageous that thicker films result using faster withdrawal rates.

Where coatings thicker than 2,000 angstroms are desired, one or more repeat dips are performed. The coating of a first dip is allowed to dry, and then the second dip is conducted. Typically, the thickest coating that can be obtained in a single dip is about 2,000 angstrom units. Hence, a triple dip would be required in order to get a coating 6,000 angstroms thick.

Surprisingly, the introduction of a wetting agent into the dip solution enhances the quality of the coatings after firing. Normally, the coatings have poor cosmetics, especially the thicker coatings, i.e., in excess of 2,000 angstroms. They are spotty or appear runny. By adding 0.5% to 20% by volume, preferably 1% to 15% by volume, of a nonionic wetting agent to the dip solution, preferably after the alcohol-transition metal nitrate mixing is completed, one can obtain thick coatings of excellent cosmetic quality. Surprisingly, the most preferred nonionic wetting agents by far are the alkyl polyoxyalkylene ethers. These are usually 100% active. The precise most preferred amount to be used in any given solution may vary, but can be empirically determined by those skilled in the art. The most preferred of these is Mazawet DF ™, a product of Mazer Chemicals, Inc.

The use of a small amount of ethyl acetate in the solution also improves the uniformity of the coatings obtained. Preferably, ethyl acetate comprises from about 5 to about 60% by volume of the solution.

Further upon dip coating, it is preferable to modify the transition metal nitrate solution by mixing it with an equal amount of an alcohol solvent/silica coating solution containing from about 5% to about 10% by weight/volume partially hydrolyzed tetraethyl-o-silicate. This results in a coating with superior hardness and superior adherence to an underlying glass or ceramic substrate. The ratio of the partially hydrolyzed tetraethyl-o-silicate solution to the metal nitrate solution is 5:95 to 75:25, preferably 50:50, to provide an amount of tetraethyl-ortho silicate in the range from 0.25 to 7.5 weight percent, based on total volume of solution.

Hydrolysis and condensation of the resulting coating is then completed by exposure to the atmosphere and firing at temperatures of about 100° C. to about 400° C. Firing is allowed to proceed for from about 15 to about 120 minutes. Different metal nitrate coatings will require different firing conditions, as will be appreciated by reference to the examples herein.

Figure 2:
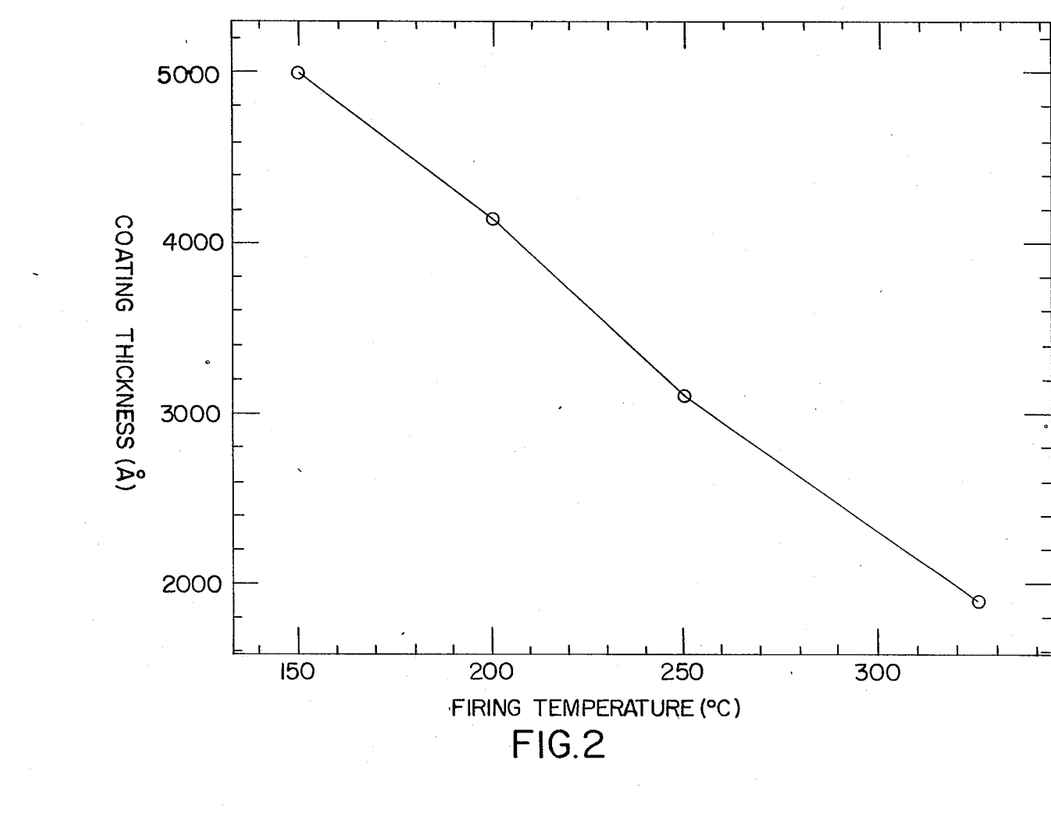
FIG. 2 plots film density, as measured by after-firing thickness, against variation in firing temperature where the prefiring coating thickness was the same in all cases.

Firing also has an important impact on coating density and electrochromic coloring efficiency. When the coatings are applied at the same withdrawal rate from the same solution, thinner coatings are obtained after firing at higher temperatures. Increased firing temperature increases film density. This makes the film tougher and more resistant to scratching and the like. The relationship between coating thickness and firing temperature is illustrated in FIG. 2. The procedure followed for the FIG. 2 data points is as outlined in Example 7, at a withdrawal rate of 20 cm/minute. All test pieces were fired for one hour.

Figure 3:
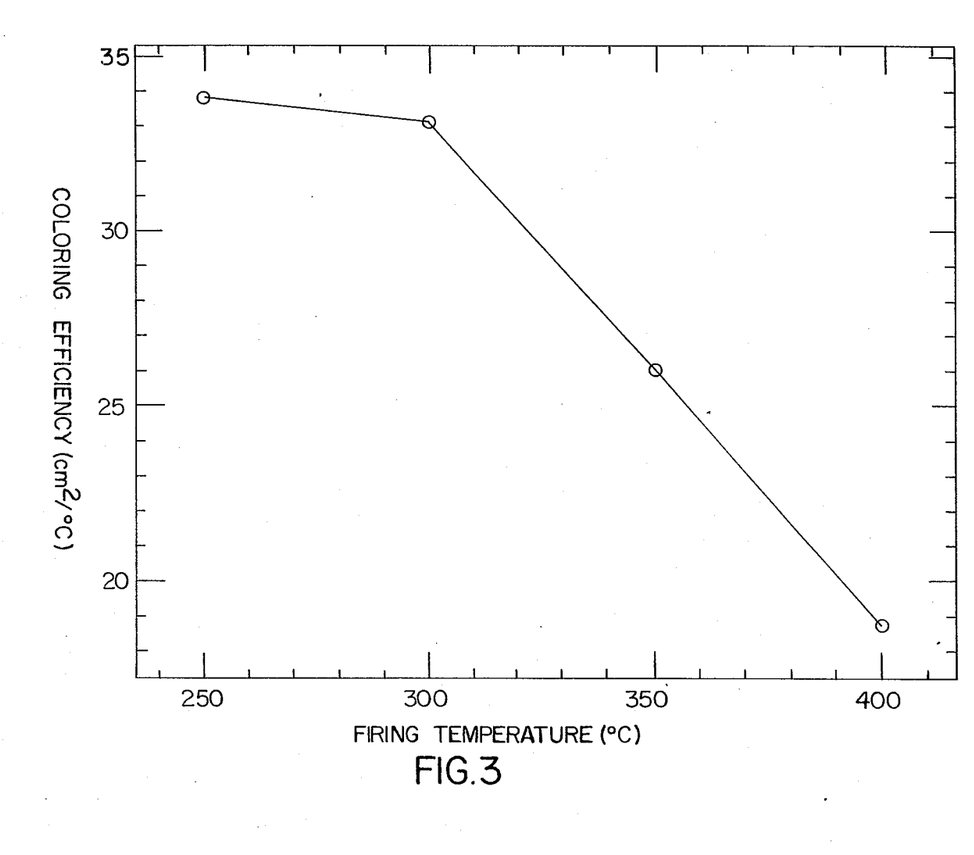
FIG. 3 plots coloring efficiency against firing temperature.

However, the desirability of a tougher film must be balanced against the coloring efficiency of the film. Coloring efficiency is a measure of color produced (or depth of coloring) in a film of unit area (e.g., cm²) when it stores a unit amount of charge (e.g., coulomb). As illustrated in FIG. 3, coloring efficiency is decreased as firing temperatures are increased. The firing is done in air. The FIG. 3 data points were generated using the same coatings as were used for the data points in FIG. 2.

In order to optimize these competing values, density versus coloring efficiency, the firing temperature is preferably between 150° C. and 350° C., and most preferably between 200° C. and 300° C.

Figure 4:
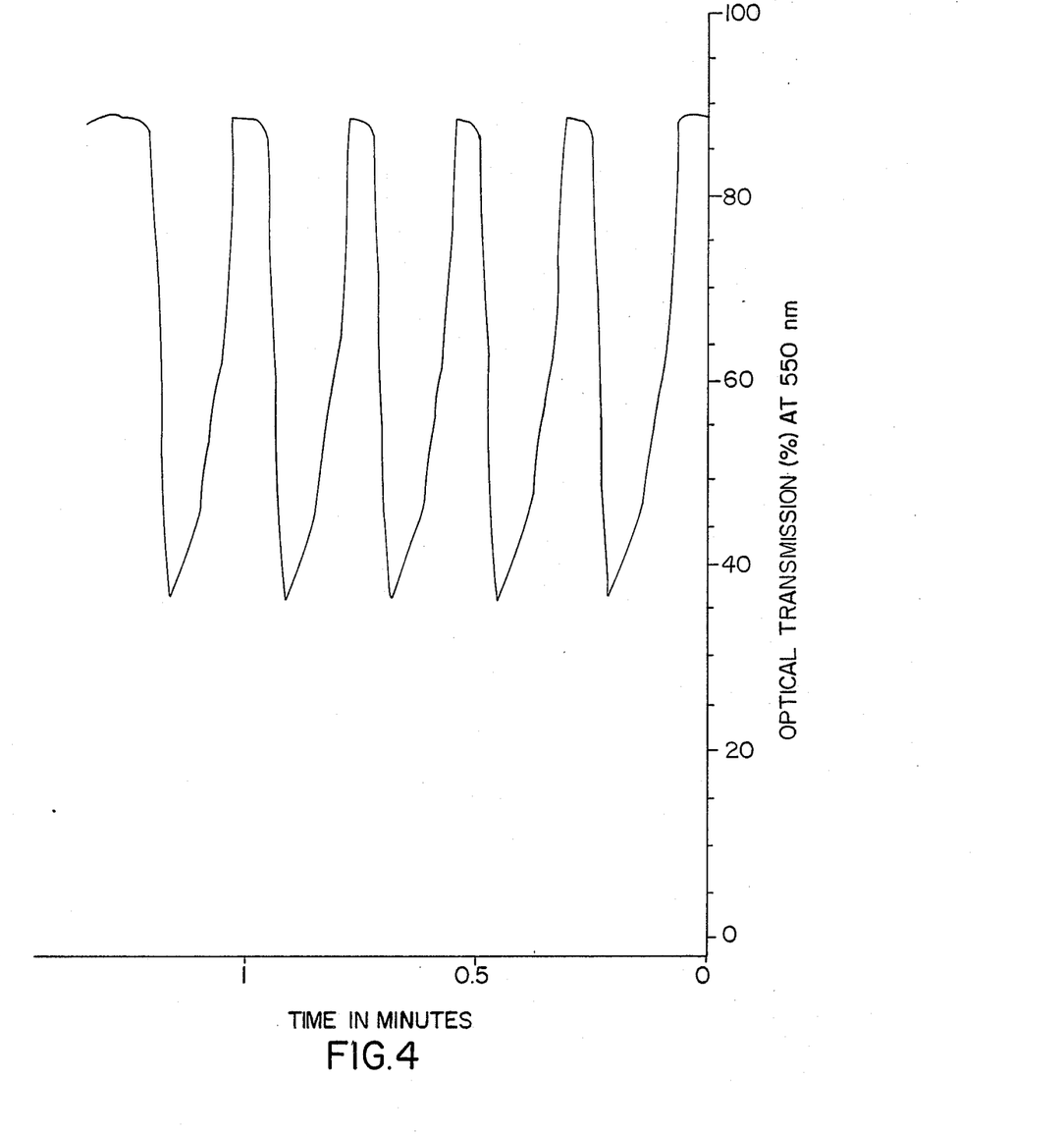
FIG. 4 is a graph showing percent light transmission versus time for a nickel oxide coating repeatedly cycled every 15 seconds.
Figure 5:
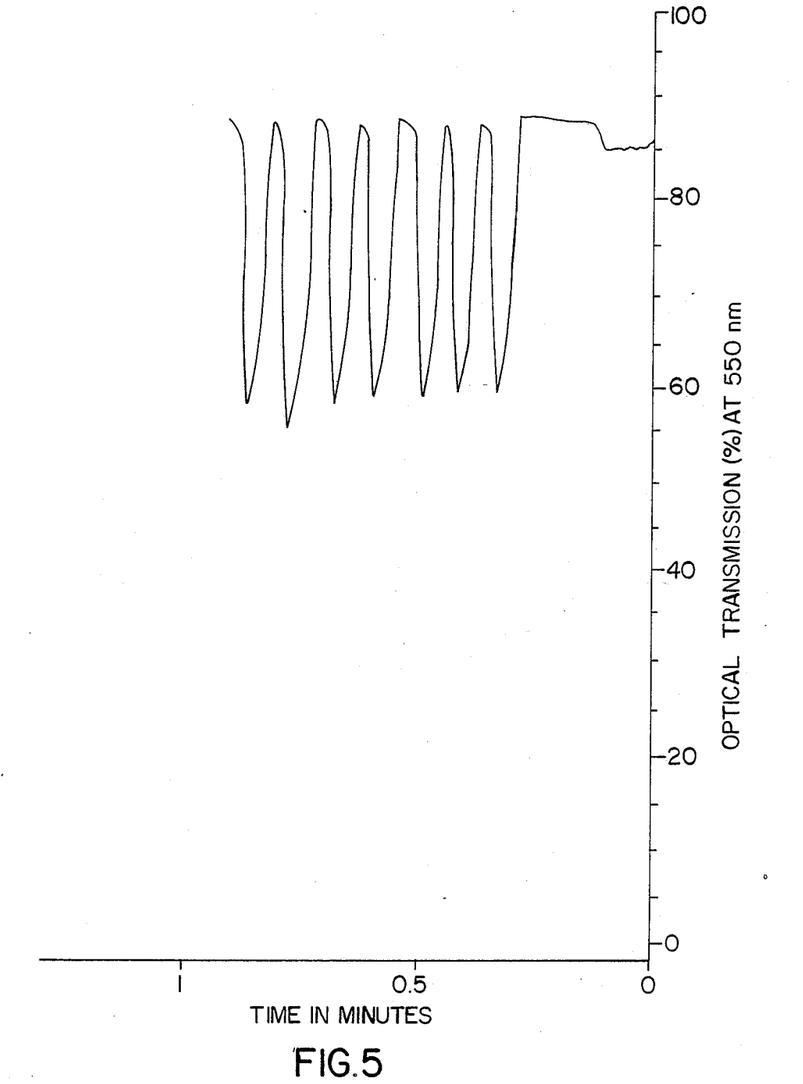
FIG. 5 is a graph showing percent light transmission versus time for a nickel oxide coating repeatedly cycled every 5 seconds.

The optical transmission of typical coatings made in accordance with the present invention decreases from in excess of 80% to less than 50% in a matter of seconds, giving an easily visible and rapid color change. FIGS. 4 and 5 were generated using the coating solution of Example 7. Glass samples coated with indium-tin oxide were dipped, removed at 20 cm/minute and fired at 250° C. for an hour. The glass sample was then made into an electrochromic cell with 1 N potassium hydroxide as the electrolyte and with a platinum counterelectrode. It was alternatively subjected to 1.8 volts positive and negative to effect coloring and bleaching. A typical result is shown in FIGS. 4 and 5 for a nickel oxide coating which is repeatedly cycled from colored to clear. FIG. 4 shows the change in optical transmission when cycled every 15 seconds. FIG. 5 shows the effect of cycling the same coating every 5 seconds.

One advantage to the solutions of the present invention is that solutions of nitrates of differing transition metals can be combined to achieve a mixed oxide coating. Thus, for example, a solution of nickel nitrate and cobalt nitrate can be blended together. An indium-tin oxide coated glass substrate can be dipped into the combined solution and fired as described above. The resulting coating will be a nickel oxide-cobalt oxide coating. In this manner, mixed oxide coatings can easily be obtained which may have interesting properties.

EXAMPLES

Preparation of the coating solutions in accordance with the present invention is illustrated by the following examples:

Example 1

44 g of nickel nitrate hexahydrate were placed in a 500 ml round bottomed flask fitted with a thermometer, stir bar and reflux condenser. 20 ml methanol and 150 ml anhydrous denatured alcohol were added to the flask. The solution was refluxed for 4½ hours. It was then cooled to 35° C. and filtered. The filter was washed with 35 ml ethyl acetate to wash residual nickel nitrate out of the filter medium and in addition to the wash, 25 ml ethyl acetate was added to the solution. Another 75 ml ethyl acetate was added to 150 ml of the filtered solution.

To the filtered solution there was then added 0.5 ml alkylpolyalkylene ether nonionic wetting agent. An electrically conductive indium-tin oxide (90:10 ratio) coated glass was dipped into the clear green solution and removed at a rate of 25 cm per minute. The cosmetic appearance of the coating was excellent. Fired at 260° C. for one hour it showed a reversible change in optical transmission (at 530 nm) of 34% (94-60%) which increased to 45% (85-40%) on recycling several times, when made into an electrochromic cell with 1 N potassium hydroxide and a platinum counterelectrode and subjected to a potential of 2 volts.

Example 2

To 22 g cobalt nitrate hexahydrate in a 500 ml flask fitted with a thermometer, stir bar and reflux condenser, 150 ml anhydrous denatured alcohol was added. The solution was refluxed for 5 hours and then allowed to stir overnight (16 hours). The solution was then filtered at 20° C. and the filter washed with 15 ml anhydrous denatured alcohol and with 40 ml ethyl acetate. Then 110 ml additional ethyl acetate was added. The solution was then divided into 2 parts of 155 ml each. The solution was clear and red in color.

0.5 ml alkylpolyalkylene ether wetting agent was added to 155 ml of the cobalt nitrate solution. It was necessary to dry the dipped glass in a hot oven immediately after dipping to get a good coating. Electrically conductive indium-tin oxide (90:10 ratio) coated glass was dipped into the clear red solution and removed at a rate of 45 cm per minute. The cosmetic appearance of the coating was excellent. The glass was dried immediately in a hot oven and fired at 200° C. for one hour. The glass was then made into an electrochromic cell using 1 N potassium hydroxide and a platinum counter-electrode. The cobalt oxide coating showed a reversible 8% change (53% to 45%) in optical transmission at 530 nm when subjected to a potential of 2 volts.

Example 3

To 80 ml of anhydrous denatured alcohol were added 36 g of 50% manganese nitrate (0.1 mol). The mixture was stirred for one hour and diluted with an additional 40 ml of anhydrous denatured alcohol. The solution was clear and colorless. 3 ml of alkylpolyalkylene ether anionic wetting agent was added to the solution. An electrically conductive indium-tin oxide (90:10 ratio) coated glass was dipped into the anionic wetting agent-containing coating solution and removed at a rate of 25 cm per minute. The coating was of uniform thickness and otherwise cosmetically excellent. The coated substrate was heated to 300° C. for one hour to dry and convert the coating to a manganese oxide coating. The manganese oxide coating had an optical transmission of 40% at 550 nm which changed to 30% when subjected to a potential of 2 volts when made into an electrochromic cell with 1 N potassium hydroxide electrolyte and a platinum counter-electrode.

Example 4

120 ml methanol and 900 ml anhydrous denatured alcohol was added to 264 g nickel nitrate hexahydrate in a 2 liter round bottomed flask, equipped with a thermometer, stir bar and reflux condenser. The nickel nitrate went into solution quickly and the solution was refluxed (76°-77° C.) for 4.5 hours. The solution was filtered into a 4 liter plastic container. The filter was washed with 100 ml ethyl acetate and 800 ml more ethyl acetate was added. The solution totaled 2000 ml. To the solution was added 200 ml of a 7% solids solution of partially hydrolyzed tetraethyl-o-silicate and 50 ml of an alkyl polyalkylene ether type of nonionic surfactant. The silicate solution added to the hardness of the coating and the surfactant helped the solution wet the substrate better.

Electrically conductive, indium-tin oxide (90:10 ratio) coated glass was dipped into the clear green solution and removed at a rate of 28 cm per minute. The coated glass was fired at 300° C. for an hour. When made into an electrochromic cell with 1 N potassium hydroxide as the electrolyte and a platinum counterelectrode and subjected to a potential of 1.8 volts, it showed a reversible change in optical transmission (at 550 nm) cf 23.3% (89.8 to 66.5%). The coating thickness was 685 Å. The coloring efficiency at 550 nm was 32 sq. cm per coulomb.

A similar coating was made at a removal rate of 45 cm per minute and fired at 300° C. When made into an electrochromic cell as above, it showed a reversible change in optical transmission at 550 nm of 24.3% (85.7 to 61.4%). The coating thickness was 1553 Å and the coloring efficiency 25.2 sq. cm per coulomb.

A similar coating was made at a removal rate of 14 cm per minute and fired at 300° C. When made into an electrochromic cell as above, it showed a reversible change in optical transmission of 16.3% (88.1 to 71.8%). The coating thickness was 478 Å and the coloring efficiency 27.8 sq. cm per coulomb.

The above solution was also sprayed as a fine mist onto electrically conductive glass that had been preheated to 350° C. The solution coated the glass with a good cosmetic appearance and showed good electrochromic performance when tested as above. The reversible change in optical transmission was 5.9% (92.4 to 86.5%). The coating thickness was about 1200 Å and the coloring efficiency at 550 nm was 18.4 sq. cm per coulomb.

1.5 ml of the above solution was placed on an 8 centimeter square of conductive coated glass which was spun at 2000 rpm. The coating wetted the surface. The coated glass was then heated to 300° C. for 30 minutes. The coating showed good electrochromic properties, reversibly changing 16% (91.2 to 75.2%) in optical transmission when tested as above. The coating thickness was about 1150 Å and the coloring efficiency at 550 nm was 30.1 sq. cm per coulomb.

Example 5

170 ml methanol was added to 44 g nickel nitrate hexahydrate in a 500 ml flask equipped with a thermometer, reflux condenser and stir bar. Agitation was started and the mixture was heated on an electric hot plate to reflux temperature (65° to 67° C.) for 4.5 hours. The mixture was cooled, filtered and the filter washed with 50 ml ethyl acetate. 150 ml more ethyl acetate was added to the filtered solution. 20 ml of 2,4-pentanedione and 14 ml of a nonionic surfactant, especially one of the alkylpolyoxyalkylene ether type, was added.

The indium-tin oxide coated glass was dipped into this solution and removed at a withdrawal rate of 28 cm per minute. The glass was fired at once to 270° C. for an hour. The test piece was made into an electrochromic cell using 1 N potassium hydroxide as the electrolyte and a platinum counterelectrode. When subjected to a potential of 1.8 volts, the nickel oxide coated glass had a reversible change in optical transmission at 550 nm of 26% (93% to 67%). The coating had a coloring efficiency of 23 sq. cm per coulomb and a thickness of 403 Å.

Example 6

250 ml isopropyl alcohol was added to 66 g nickel nitrate hexahydrate in a one liter flask equipped with a thermometer, reflux condenser and magnetic stir bar. The agitation was turned on and the mixture heated to reflux (82° to 83° C.) for five hours. The solution was filtered to ensure clarity. 100 ml ethyl acetate was added. The solution volume was 400 ml. 1.8 ml of a nonionic surfactant, one of the alkylpolyoxyalkylene ether type, was added to 200 ml of the above solution.

A piece of electrically conductive indium-tin oxide coated glass was dipped into the solution and removed at a rate of 28 cm per minute. The glass was fired at 300° C. in an electric furnace. This was made into an electrochromic cell with 1 N potassium hydroxide and a platinum counterelectrode. When the cell was subjected to a potential of 1.8 volts, it had a reversible change in optical transmission at 550 nm of 60% (95% to 35%).

Example 7

250 ml of n-propyl alcohol was added to 66 g nickel nitrate hexahydrate in a flask equipped as in Example 6. The agitation was started and the mixture heated to reflux (93° C.) for five hours. It was cooled and filtered to ensure clarity and 100 ml of ethyl acetate added. Nine ml of a nonionic surfactant, one of the alkylpolyoxyalkylene ether type, was added to the filtered solution.

A piece of electrically conductive indium-tin oxide coated glass was dipped into the solution and removed at the rate of 28 cm per minute. The glass was fired at 300° C. in an electric furnace. When this was made into an electrochromic cell with 1 N potassium hydroxide and a platinum counterelectrode and subjected to a potential of ±1.8 volts, it had a reversible change in optical transmission at 550 nm of 56% (89% to 33%). The thickness of the nickel oxide coating was 2000Å and the coloring efficiency 33 sq. cm per coulomb.

Example 8

150 ml of n-butyl alcohol and 20 ml of methanol was added to 44 g nickel nitrate hexahydrate in a 500 ml flask equipped as in Example 6. The agitation was started and the flask heated to reflux (95° C.) for 4.5 hours. It was cooled to 22° and filtered and washed with 50 ml ethyl acetate. 150 ml more ethyl acetate was added to the solution. Nine ml of a nonionic surfactant, one of the alkylpolyoxyalkylene ether type, was added to the solution.

A piece of electrically conducting indium-tin oxide coated glass was dipped into the solution and removed at a rate of 28 ml per minute. The glass was fired in an electric furnace at 275° C.

This was made into an electrochromic cell with 1 N potassium hydroxide and a platinum counterelectrode. When subjected to a potential of 1.8 volts, it showed a change in optical transmission of 28% (85% to 57%) at 550 nm. The nickel oxide coating thickness was 545 Å and the coloring efficiency 31.4 sq. cm per coulomb.

Example 9

To 44 g nickel nitrate hexahydrate, 20 ml methanol and 150 ml anhydrous denatured ethanol was added in a 500 ml flask equipped with a thermometer, reflux condenser and magnetic bar stirrer. The mixture was agitated at room temperature (20° to 24° C.) for 4.5 hours. All went into solution quickly. The mixture was filtered through a fine filter paper and washed with 25 ml of ethyl acetate. Then 175 ml ethyl acetate was added to the solution. 19 ml of an anionic surfactant of the alkylpolyalkylene ether type was added and an additional 115 ml of ethyl acetate. The product had good wetting properties.

Electrically conductive indium-tin oxide coated glass was dipped into this solution and removed at a rate of 28 cm per minute. The glass test piece was then fired at 275° C. for one hour. When the test piece was made into an electrochromic cell with 1 N potassium hydroxide as the electrolyte and a platinum counterelectrode and subjected to a potential of ±1.8 volts, the coating gave a reversible change in optical transmission of 26% (92% to 66%) at 550 nm. The coloring efficiency was 28.3 sq. cm per coulomb and the coating thickness 339 Å.

Example 10

To 60.5 g chromic nitrate nonahydrate in a 500 ml round-bottomed flask equipped with a thermometer, stir bar and reflux condenser, 180 ml anhydrous denatured alcohol was added. The mixture was stirred at room temperature for five hours. The solution was filtered through a fine filter paper to ensure clarity. The filter was washed with 40 ml ethyl acetate and 160 ml more ethyl acetate was added to the filtered solution. Four ml of an alkylpolyoxyalkylene ether type of nonionic surfactant was then added to the solution.

Indium-tin oxide coated conductive glass was dipped into the solution and removed at a withdrawal rate of 28 cm per minute. It dried quickly at room temperature and was fired at once to 300° C. for an hour. A test piece thus formed was made into an electrochromic cell using 1 N potassium hydroxide as the electrolyte and a platinum counterelectrode. When subjected to a potential of 1.8 volts, the coated glass had a reversible change in optical transmission at 550 nm of 6% (86% to 80%). The coating had a thickness of about 901 Å.

Example 11

To 29 g yttrium nitrate hexahydrate in similar equipment to that used in Example 10, there was added 85 ml of anhydrous denatured alcohol. The mixture was heated to reflux (78° C.) for 4.5 hours. To ensure clarity the cooled solution was filtered and the filter washed with 20 ml ethyl acetate. 80 ml ethyl acetate was added to the solution. Three ml of a nonionic surfactant of the alkylpolyalkylene ether type and 50 ml more ethyl acetate were then added.

Indium-tin oxide coated conductive glass was dipped into the final solution and removed at a withdrawal rate of 28 cm/minute. It dried quickly at room temperature and was fired at once to 300° C. for an hour. A test piece thus formed was made into an electrochromic cell using 1 N sulfuric acid as the electrolyte and a platinum counterelectrode. When subjected to a potential of 1.8 volts, the coated glass had a reversible change in optical transmission of about 8.5% (93.5% to 85%) at 550 nm. The coating had a thickness of about 1642 Å.

Example 12

To 45 g cupric nitrate hexahydrate in similar equipment to that used in Example 10 was added 20 ml methanol and 150 ml anhydrous denatured alcohol. The mixture was heated to reflux (76°–77° C.) for 4.5 hours. After allowing the solution to cool to room temperature, the solution was filtered through fine paper to ensure clarity. The filter was washed with 50 ml ethyl acetate and 150 ml more ethyl acetate was added to the solution. Four ml of a nonionic surfactant of the alkylpolyalkylene ether type was then added.

Indium-tin oxide coated conductive glass was dipped into the solution and removed at a withdrawal rate of 28 cm/minute. It dried quickly at room temperature and was fired at once to 300° C. for an hour. A test piece thus formed was made into an electrochromic cell using 1 N potassium hydroxide as the electrolyte and a platinum counterelectrode. When subjected to a potential of 1.8 volts, the coated glass had a reversible change in optical transmission of 7% (85% to 78%) at 550 nm. The coating had a thickness of about 400 Å.

Example 13

To 61 g of ferric nitrate nonahydrate in similar equipment to that used in Example 10, there was added 20 ml methanol and 150 ml anhydrous denatured ethanol. The mixture was stirred at room temperature for 40 hours. The cooled solution was filtered to ensure clarity and the filter washed with 50 ml ethyl acetate. Then, 150 ml ethyl acetate was added. One ml of a nonionic surfactant of the alkylpolyalkylene ether type was then added.

Indium-tin oxide coated conductive glass was dipped into the solution and removed at a withdrawal rate of 28 cm/minute. It dried quickly at room temperature and was fired at once to 300° C. for an hour. A test piece thus formed was made into an electrochromic cell using 1 N potassium hydroxide as the electrolyte and a platinum counterelectrode. When subjected to a potential of 1.8 volts, the coated glass had a reversible change in optical transmission of 3.5% (53% to 49.5%) at 550 nm. The coating had a thickness of about 935 Å. In a similar cell using a 1 N sulfuric acid electrolyte, the change was 2% (50% to 48%) in optical transmission at 550 nm.

Example 14

It is easy to make mixtures of metal oxide coatings either by mixing the nitrates on any basis that may be desired and preparing the solution of the mixture or by making coating solutions of each metal nitrate and then mixing them on an exact basis. It is also possible to combine both methods as illustrated in Example 15.

To 32 g of nickel nitrate (molecular weight 291) and 32 g of cobalt nitrate (molecular weight 291) contained in a 500 ml round bottomed flask equipped with a thermometer, magnetic stir bar and reflux condenser, 30 ml methanol and 225 ml anhydrous denatured alcohol was added. All dissolved readily at room temperature (21° C.) with agitation. After stirring the solution for three and a half hours, the solution was filtered and diluted with 225 ml ethyl acetate. To improve the wetting of the solution for electrically conducting indium-tin oxide coated glass, 5 ml of Mazawet DF (a nonionic surfactant of the alkyl polyoxyalkylene ether type) was added to the 500 ml of solution. This solution is a 50:50 mol percent mixture of nickel and cobalt nitrates.

After dipping the indium-tin oxide coated glass in the solution and removing it at a rate of 14 cm per minute, it was dried by holding it over a hot plate which gave a clear coating over most of the glass. The coated glass was made into an electrochromic cell with 1 N potassium hydroxide as the electrolyte and a platinum counter-electrode, the cell showed a reversible change in optical transmittance of 8.2% (56.5 to 48.3%) when subjected to a voltage of ±0.5 volts. The coloring efficiency at 550 nm was 18.3 sq. cm per coulomb.

Example 15

As an example of mixing solutions, a 90% nickel nitrate to 10% cobalt nitrate solution was made by mixing 0 ml of the 50:50% solution of nickel nitrate-cobalt nitrate as prepared in Example 14 with 80 ml of nickel nitrate solution containing about 3 ml of Mazawet DF (as in Example 9). This solution coated indium-tin oxide (90:10) coated conductive glass well.

A sample of such coated glass was dipped into the 90% nickel nitrate: 10% cobalt nitrate solution and removed at a rate of 28 cm per minute and then fired at 300° C. for an hour. When a sample was made into an electrochromic cell with 1 N potassium hydroxide solution as the electrolyte and a platinum counterelectrode, it showed good electrochromic properties with a 12.9% reversible change in optical trans mission (84.5 to 71.6%) when subjected to ±0.5 volts. The film thickness was 1096 Å and the coloring efficiency at 550 nm was 30.4 sq. cm per coulomb.

Example 16

In a similar way, a 90% cobalt nitrate: 10% nickel nitrate solution was prepared by mixing 10 ml of the 50:50% mixture of nickel nitrate: cobalt nitrate of Example 14 with 80 ml of the cobalt nitrate solution of Example 2. To the mixture, 0.5 ml of Mazawet DF was added to improve wetting of the solution for glass and indium-tin oxide (90:10%) coated glass.

A sample of indium-tin oxide coated conductive glass was dipped into the 90% cobalt nitrate: 10% nickel nitrate solution and removed at a rate of 28 cm per minute. It was fired at 300° C. for an hour.

A sample of that glass was made into an electrochromic cell with 1 N potassium hydroxide as the electrolyte and with a platinum counterelectrode. It showed a reversible electrochromic change in optical transmission of 3.8% (58.5 to 54.7%) when subjected to ±0.5 volts. The film thickness was 1475 Å and the coloring efficiency at 550 nm was 13.7 sq. cm per coulomb.

The process of the present invention is very amenable to coating electrochromic oxides. This compares favorably to vacuum techniques where refractory oxide deposition typically requires electron beam evaporation, reactive sputter deposition (dc or rf) or rf sputter deposition from a pressed oxide target.

The present method is a nonvacuum technique. Equipment is thus relatively inexpensive. The process is easy to scale up and it is amenable to coating very large substrates. The technique can be used to commercially coat glass panes of several square meters in area.

It is economical to coat thick oxide films. Using the preferred dip coating technique, the faster the withdrawal rate, the thicker the film. This compares very favorably to other techniques where, typically, a 5000 angstrom WO3 coating takes roughly 10 times longer than a 500 angstrom coating.

While dip coating is preferred, spray or spin coating can, in the broader aspects of the invention, be used instead of dip coating.

Finally, substrate coated in accordance with the present invention can be coated on both sides simultaneously if desired.

Of course, it is understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A method for preparing an electrochromic coating on a substrate, consisting essentially of:
    forming a coating solution by contacting at least one transition metal nitrate compound with at least one monohydric alcohol having from 1 to 5 carbon atoms;
    coating the surface of said substrate with said coating solution to provide a coating thereon of a desired thickness; and
    firing said coating to an electrochromically active state.

2. A method in accordance with claim 1 wherein said coating solution comprises from 5 to 20 weight/volume percent of transition metal nitrate.

3. A method in accordance with claim 2 wherein said transition metal nitrate comprises nickel nitrate.

4. A method in accordance with claim 2 wherein said transition metal nitrate comprises an admixture of nickel nitrate and cobalt nitrate.

5. A method for preparing an electrochromic coating on a substrate, comprising:
    forming a coating solution comprising at least one monohydric alcohol having from 1 to 5 carbon atoms, from 5 to 20 weight/volume percent of at least one transition metal nitrate and from 5 to 60 weight/volume percent of ethyl acetate;
    coating the surface of said substrate with said coating solution to provide a coating thereon of a desired thickness; and
    firing said coating to an electrochromically active state.

6. A method in accordance with claim 2 wherein said coating solution contains from 0.1 to 20 weight/volume percent of at least one nonionic wetting agent.

7. A method in accordance with claim 5 wherein said coating solution contains from 0.1 to 20 weight/volume percent of at least one nonionic wetting agent.

8. A method in accordance with claim 2 wherein said coating solution contains from 0.25 to 7.5 weight/volume percent tetraethylorthosilicate.

9. A method in accordance with claim 5 wherein said coating solution contains from 0.25 to 7.5 weight/volume percent tetraethylorthosilicate.

10. A method in accordance with claim 1 wherein said coating solution contains from 0.1 to 20 weight/volume percent of at least one nonionic wetting agent.

11. A method in accordance with claim 5 wherein said coating solution contains from 0.1 to 20 weight/volume percent of at least one ;nonionic wetting agent and from 0.25 to 7.5 weight/volume percent of tetraethylorthosilicate.

12. A method in accordance with claim 2 wherein said firing is effected at a temperature in the range from 100° to 400° C.

13. A method in accordance with claim 12 wherein said transition metal nitrate comprises nickel nitrate.

14. A method in accordance with claim 12 wherein said transition metal nitrate comprises an admixture of nickel nitrate and cobalt nitrate.

15. A method in accordance with claim 12 wherein said coating solution contains from 5 to 60 weight/volume percent of ethyl acetate.

16. A method in accordance with claim 12 wherein said coating solution contains from 0.1 to 20 weight/volume percent of at least one nonionic wetting agent.

17. A method in accordance with claim 5 wherein said coating solution contains from 0.1 to 20 weight/volume percent of at least one nonionic wetting agent and said firing is effected at a temperature in the range from 100° to 400° C.

18. A method in accordance with claim 12 wherein said coating solution contains from 0.25 to 7.5 weight/volume percent tetraethylorthosilicate.

19. A method in accordance with claim 5 wherein said coating solution contains 0.25 to 7.5 weight/volume percent tetraethylorthosilicate and said firing is effected at a temperature in the range from 100° to 400° C.

20. A method in accordance with claim 18 wherein said coating composition contains from 0.1 to 20 weight/volume percent of at least one nonionic wetting agent.

21. A method in accordance with claim 5 wherein said coating composition contains from 0.1 to 20 weight/volume percent of at least one wetting agent and from 0.25 to 7.5 weight/volume percent of tetraethylorthosilicate and said firing is effected at a temperature in the range from 100° to 400° C.

22. A method in accordance with claim 1 wherein said substrate has at least one electrically conductive surface.

23. A method in accordance with claim 22 wherein said coating solution comprises from 5 to 20 weight/volume percent transition metal nitrate.

24. A method in accordance with claim 23 wherein said transition metal nitrate comprises nickel nitrate.

25. A method in accordance with claim 23 wherein said transition metal nitrate comprises an admixture of nickel nitrate and cobalt nitrate.

26. A method in accordance with claim 5 wherein said substrate has at least one electrically conductive surface.

27. A method in accordance with claim 23 wherein said coating solution contains from 0.1 to 20 weight/volume percent of at least one nonionic wetting agent.

28. A method in accordance with claim 26 wherein said coating solution contains from 0.1 to 20 weight/volume percent of at least one nonionic wetting agent.

29. A method in accordance with claim 23 wherein said coating solution contains from 0.25 to 7.5 weight/volume percent of tetraethylorthosilicate.

30. A method in accordance with claim 26 wherein said coating solution contains from 0.25 to 7.5 weight/volume percent of tetraethylorthosilicate.

31. A method in accordance with claim 29 wherein said coating solution contains from 0.1 to 20 weight/volume percent of at least one nonionic wetting agent.

32. A method in accordance with claim 26 wherein said coating solution contains from 0.1 to 20 weight/volume percent of at least one nonionic wetting agent and from 0.25 to 7.5 weight/volume percent of tetraethylorthosilicate.

33. A method in accordance with claim 23 wherein said firing is effected at a temperature in the range from 100° to 400° C.

34. A method in accordance with claim 33 wherein said transition metal nitrate comprises nickel nitrate.

35. A method in accordance with claim 33 wherein said transition metal nitrate comprises an admixture of nickel nitrate and cobalt nitrate.

36. A method in accordance with claim 26 wherein said firing is effected at a temperature in the range from 100° to 400° C.

37. A method in accordance with claim 33 wherein said coating solution contains from 0.1 to 20 weight/volume percent of at least one nonionic wetting agent.

38. A method in accordance with claim 36 wherein said coating solution contains from 0.1 to 20 weight/volume percent of at least one nonionic wetting agent.

39. A method in accordance with claim 33 wherein said coating solution contains from 0.25 to 7.5 weight/volume percent of tetraethylorthosilicate.

40. A method in accordance with claim 36 wherein said coating solution contains from 0.25 to 7.5 weight/volume percent of tetraethylorthosilicate.

41. A method in accordance with claim 39 wherein said coating solution contains from 0.1 to 20 weight/volume percent of at least one nonionic wetting agent.

42. A method in accordance with claim 36 wherein said coating solution contains from 0.1 to 20 weight/volume percent of at least one nonionic wetting agent and 0.25 to 7.5 weight/volume percent of tetraethylorthosilicate.

* * * * *

UNITED STATES PATENT AND TRADEMARK OFFICE
CERTIFICATE OF CORRECTION

PATENT NO. : 4,959,247

DATED : September 25, 1990

INVENTOR(S) : Frank H. Moser et al.

It is certified that error appears in the above-identified patent and that said Letters Patent is hereby corrected as shown below:

Column 7, Line 4:
"cf 23.3%" should read --of 23.3%--;

Column 10, Line 62:
"O ml" should read --20 ml--;

Column 12, Line 43:
";nonionic" should read --nonionic--.

Signed and Sealed this

Seventh Day of April, 1992

Attest:

HARRY F. MANBECK, JR.

*Attesting Officer*      *Commissioner of Patents and Trademarks*